Sept. 25, 1928.
M. STOCKOV.
VEHICLE STOP
Filed Sept. 16, 1926
1,685,467
2 Sheets-Sheet 1
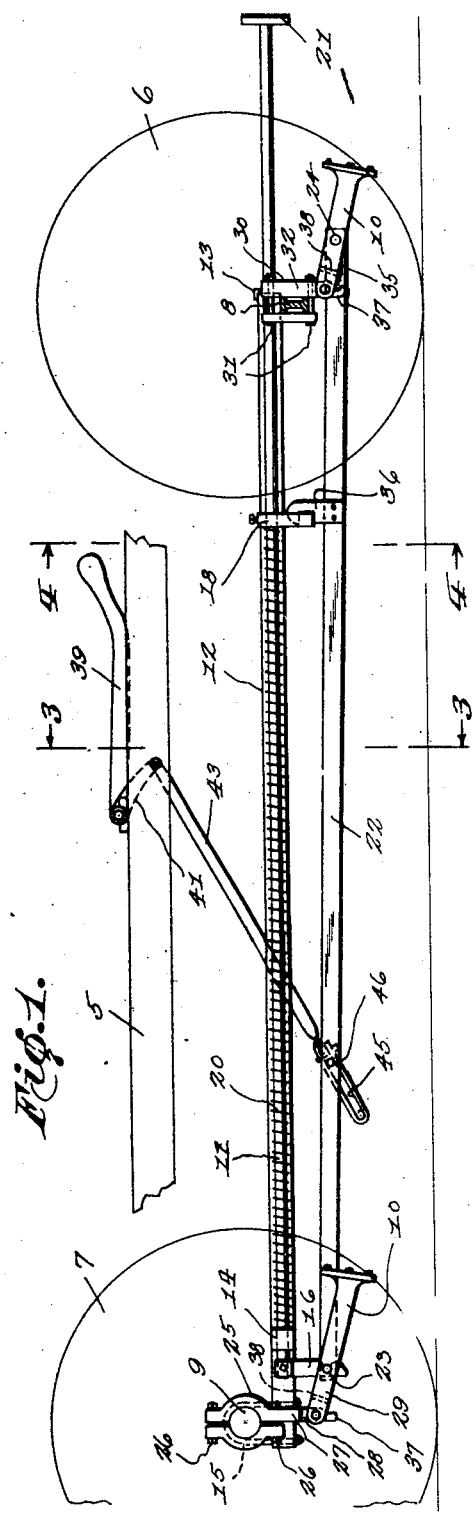
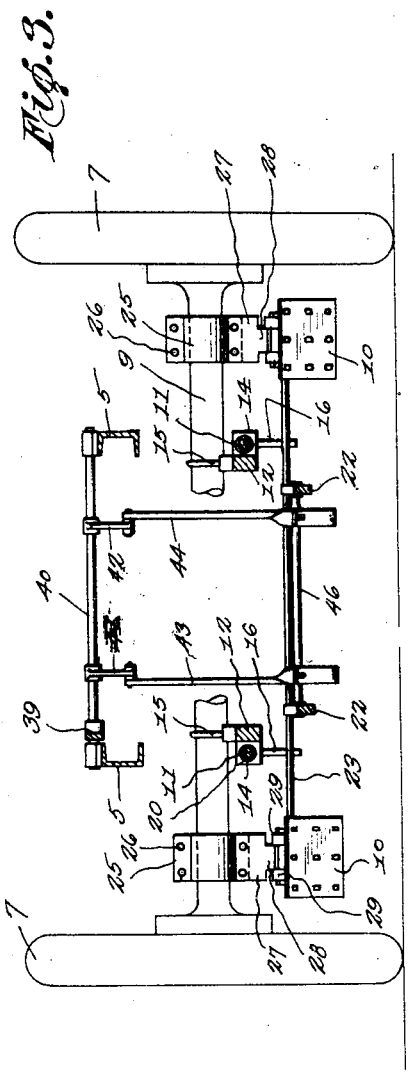
Inventor
Max Stockov.
By F. V. Winters
Attorney Sept. 25, 1928.  
M. STOCKOV  
1,685,467  
VEHICLE STOP  
Filed Sept. 16, 1926  
2 Sheets-Sheet 2
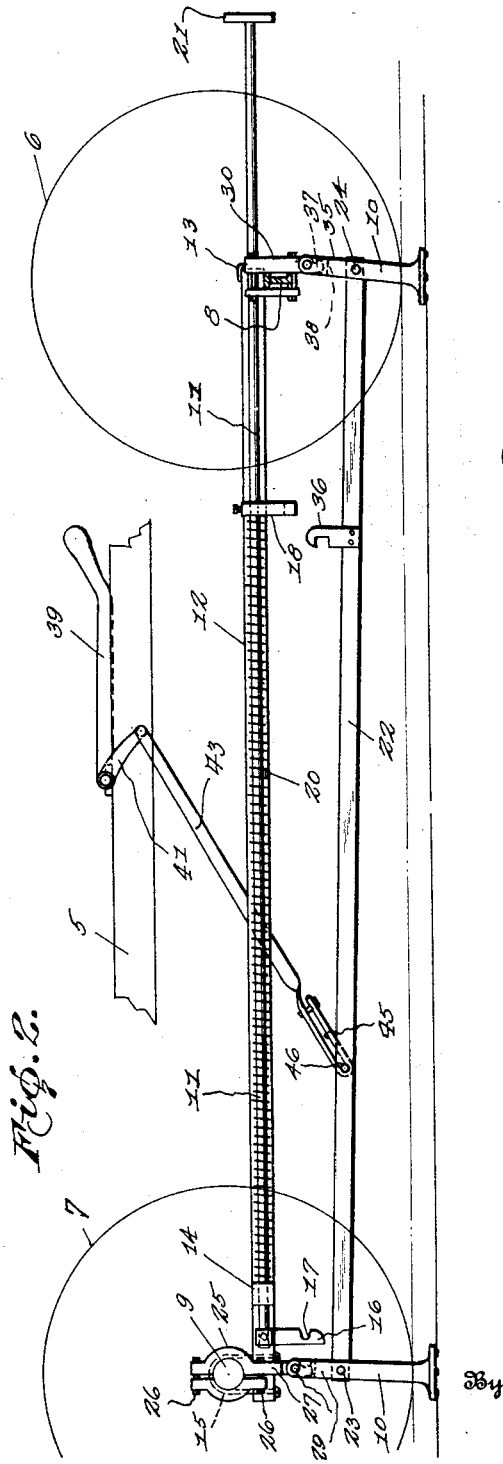
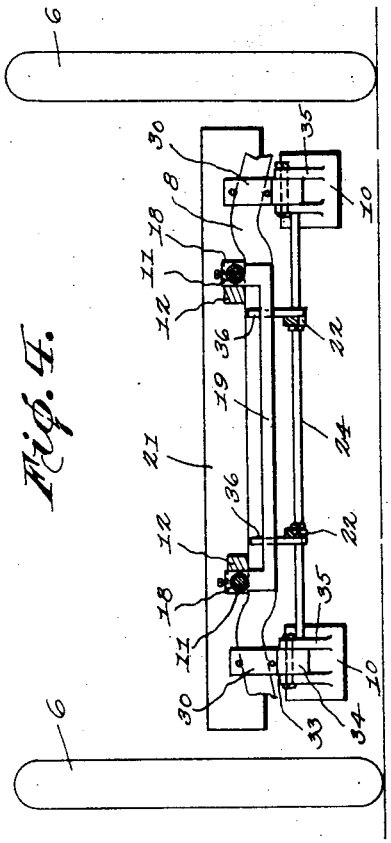
Inventor  
Max Stockov.  
By  
F. V. Winters  
Attorney Patented Sept. 25, 1928.

1,685,467

UNITED STATES PATENT OFFICE.

MAX STOCKOV, OF NEW YORK, N. Y., ASSIGNOR OF ONE-HALF TO MAX SHERR, OF PHILADELPHIA, PENNSYLVANIA.

VEHICLE STOP.

Application filed September 16, 1926. Serial No. 135,876.

This invention relates to improvements in means for impeding the momentum of a motor vehicle, or the like, and primarily has for its object the provision of an assemblage of mechanisms brought into operative functioning by receiving impulses indirectly by the object or article collided with.

Briefly, the invention involves the use of a member, in the form of a bumper extending transversely of the machine and just in advance of the front wheels, said bumper, upon colliding with an object, being adapted to transmit reciprocatory motion to a pair of rods extending longitudinally of the machine, to effect the disengagement of a plurality of jacks and subsequent elevation of the vehicle bodily from the ground.

The means whereby I attain the objects aforesaid, and the advantages derived therefrom, will become apparent after consideration of the description about to follow. However, it is to be understood that while the drawings present the preferred embodiment of my invention, right is reserved to make whatever changes and alterations that may fall within the spirit of the invention and the scope of the appended claims.

In the accompanying drawings:

Figure 1 is an elevation of the device mounted on a vehicle, diagrammatically shown, said device appearing in its inoperative position.

Fig. 2 is a similar view but here the device is in operative position and the vehicle elevated as indicated by the ground line and the tangent connecting the wheels.

Fig. 3 is a vertical transverse sectional view taken substantially on the line 3—3 of Fig. 1; and Fig. 4 is a similar view, but taken on the line 4—4 of Fig. 1.

In presenting the invention in illustrative form I have been mindful of the varying dimensions of the chassis of the automobiles now on the market and since it will, of course, be necessary to standardize the device thereto, it has been thought sufficient to diagrammatically illustrate the motor vehicle in so far as the particular parts thereof to which my device is attached, is concerned. Hence, in the description appearing hereinafter, but casual reference will be made to the vehicle itself, as obviously it forms no part of the invention and is only related thereto as a means to an end.

Referring now more particularly to said drawings, wherein like characters of reference denote similar parts throughout the several views, let 5 represent generally a part of a motor vehicle, which for the purposes of this description may be a portion of the chassis, such as the channel members supporting the body, or it may be the body itself. In other words, it represents a portion of a vehicle adapted for the convenient attachment of a component part of my device.

The front and rear wheels of said vehicle are denoted by the numerals 6 and 7 respectively, each pair of the respective wheels being connected by front and rear axle members 8 and 9, the latter numeral however more correctly referring to the housing inclosing said rear axle.

As hereinbefore pointed out the invention contemplates the provision of a plurality of jack members 10, there being a jack for each wheel of the vehicle and positioned adjacent thereto to effect an even and positive lifting effect during the operation of the device.

The mechanism for operating said jacks 10 comprises a pair of rods 11, extending longitudinally of the machine at opposite sides thereof, (see Figs. 3 and 4), each rod being supported by parallelly disposed bars 12, through the intermediary of bearings 13 and 14, located adjacent the respective axles of the machine, said bars in turn being suspended from the rear axle housing 9 by a clamping member 15 and resting on the front axle and secured thereto in any approved manner.

The end of the rods 11, adjacent the rear axle housing is provided with a depending detent 16 having a recess 17 on its front edge, (see Fig. 2), and intermediate the ends of said rods 11 is adjustably mounted a yoke member 18 the bight portion 19 thereof extending beneath and transversely of said bars 12, as clearly shown in Fig. 4. Said rods 11 are each provided with a compression spring 20 having its ends abutting the bearings 14 and the yoke member 18, the tension thereof being adjusted if necessary through the intermediary of the latter.

From the foregoing it is manifest that when the bumper member 21, which connects the forwardly extending rods 11, strikes or collides with an object, said rods slide rearwardly against the tension of the springs 20 and remain in this retarded position so long as the vehicle and the object remain in contact. As may well be surmised this rearward motion of said rods is utilized to effect the dropping of the jacks 10 to the position indicated in Fig. 2, said jacks on either side of the vehicle being hingedly connected to links 22, the rear terminals thereof being joined by a spacer rod 23, also loosely mounted in the rear jacks 10 and when the device is in inoperative position, as shown in Fig. 1, said spacer rod engages the recesses 17 in the detent 16 and holds said rear jacks in the position indicated. The pivotal connection between the forward jacks 10 and the links 22 is indicated at 24, and it will be observed that said jacks are each pivoted at their upper ends to certain clamping means attached to the respective axles of the vehicle, the clamping means 25 of the rear axle housing 9 being two-part and secured thereto by bolts 26, one part thereof having a depending portion 27, which is reduced, as at 28, for pivotal engagement with the arms 29 of the rear jacks 10. The clamping member 30 is similarly two-part and secured to the front axle by means of bolts 31, one part 32 having a depending portion 33, reduced as at 34 and pivotally attached to the arms 35 of said forward jacks 10. It will also be noted that said links 22 are each provided with a hook-member 36 adapted to engage the bight portion of said yoke member 18 and thus the forward end of said links is supported in the position indicated in Fig. 1.

From the foregoing it is apparent that the rearward movement of said rods 11, as aforesaid, disengages the bight portion 19 from the hook-member 36 and similarly disengages the spaced rod 23 from the recess of said detent 16, such releasing freeing the jacks from their suspended position and permitting their drop to the position indicated in Fig. 2, all of which resulting in the elevation of the vehicle from the ground or roadbed and an impedance of the motion of the same. Thus a positive braking action is assured.

It will be observed upon inspection of Fig. 2 that the jacks 10 incline rearwardly beyond the vertical axis of their pivotal connection, so that the machine serves as a brace due to its weight and since stops 37 are provided for each of the jacks by extending the reduced portions of the clamping members beyond the pivotal connection of said jacks, the cooperation of said stops and webs 38 on the arms of the jacks, prevents the rotation of the same beyond the position indicated in Fig. 2.

The mechanism for returning the jacks to inoperative position involves the use of levers and links, which specifically includes the hand lever 39 mounted on a shaft 40, suitably journalled to the part 5, (see Fig. 3), and a pair of cranks 41 and 42, pivotally secured to a pair of links 43 and 44. As shown in Figs. 1 and 2 of the drawings said links 43 and 44 are provided with slots 45 at the lower ends thereof for engagement slidably with a transverse rod 46 connecting the longitudinal links 22. When said links 22 are caught up by the detent 16 and the yoke member 18, said rod 46 is positioned in the upper portion of said slots 45 and obviously the downwardly movement of said links carries said rod 46 to the lower portion of said slots, no interference being experienced since the links 43 and 44 are free to pivot with relation to the cranks 41 and 42. Hence, in restoring the device to inoperative position it is only necessary to elevate the hand lever 39 whereupon the cooperation of the cranks 41 and 42, and links 43 and 44 with the rod 46, causes the assemblage to swing up bodily until the rod 23 is engaged in the recess of said detent 16 and the hook member 36 grasps the yoke member 18. The mechanism being thus in locked position, the hand lever 39 may be released whereupon the rod 46 slides upwardly in the slot 45 and the mechanism is at rest.

Obviously the device is susceptible of a plurality of uses as may be readily suggested to the skilled artesan.

What is claimed is:

1. The combination with a motor vehicle, of spring-tensioned rods adapted to be reciprocated, a plurality of jacks pivotally connected to said vehicle, linkage connecting the lateral jacks in tandem, detents carried by said rods, a yoke-member slidably secured to said rods and means associated with said linkage and coacting with said detents and said yoke member to release said jacks in depending position upon reciprocation of said rods.

2. The combination with a motor vehicle of spring-tensioned rods adapted to be reciprocated, a plurality of jacks pivotally connected to said vehicle, linkage connecting the lateral jacks in tandem, detents carried by said rods, a yoke-member slidable carried by said rods, means embodying a hook and rod and coacting with said yoke and detents respectively to release said jacks to depending position upon reciprocation of said rods and means embodying a slotted link adapted to return said jacks to inoperative position.

In testimony whereof I affix my signature.

MAX STOCKOV.